W. R. HARRIS.
LIGHT AND SUNSHADE GOGGLES.
APPLICATION FILED JAN. 30, 1912.
1,060,083.
Patented Apr. 29, 1913.
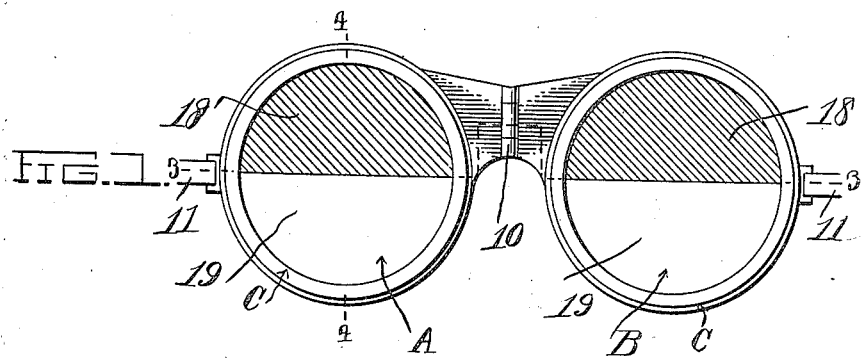
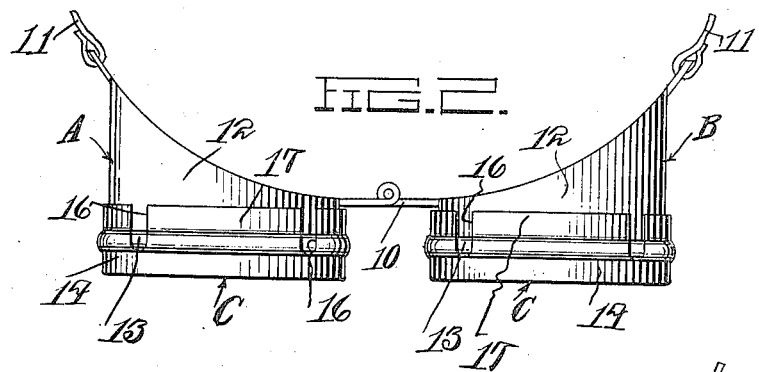
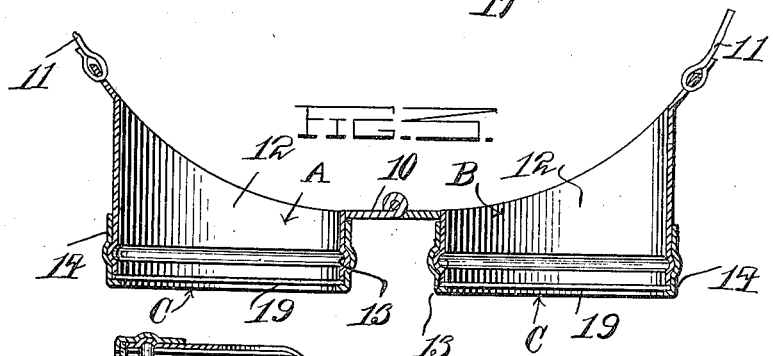
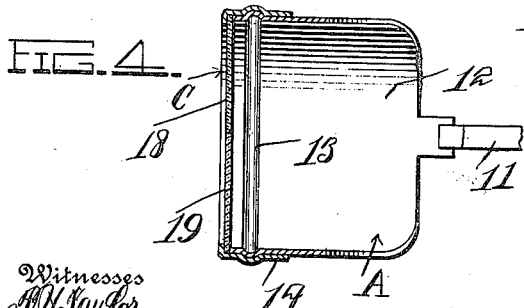
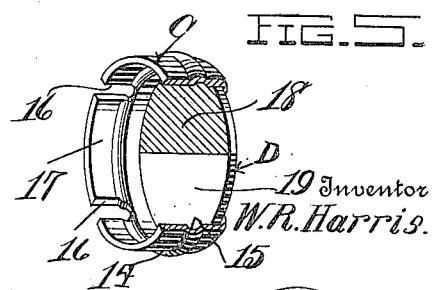
Witnesses
Inventor
W. R. Harris.
By
Attorneys

UNITED STATES PATENT OFFICE.

WALLACE R. HARRIS, OF MORRISTOWN, NEW JERSEY.

LIGHT AND SUNSHADE GOGGLES.

1,060,083. Specification of Letters Patent. Patented Apr. 29, 1913.

Application filed January 30, 1912. Serial No. 674,360.

*To all whom it may concern:*

Be it known that I, WALLACE R. HARRIS, a citizen of the United States, residing at Morristown, in the county of Morris, State of New Jersey, have invented certain new and useful Improvements in Light and Sunshade Goggles; and I do hereby declare the following to be a full, clear, and exact description of the invention, such as will enable others skilled in the art to which it appertains to make and use the same.

This invention relates to goggles and particularly that type utilized by the drivers of automobiles and other vehicles when same are being propelled at a relatively high speed.

The object of the invention resides in the provision of goggles in which the windows are each formed of a colored and plain section and adapted for adjustment whereby the colored section may be positioned between the eye of the user and a brilliant light ahead so as to obviate the blinding effect of the latter and enable the driver to clearly discern objects disposed beyond said brilliant light through the plain portion of the goggle windows.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views and in which—

Figure 1 is a front view of a pair of goggles constructed in accordance with the invention, Fig. 2, a plan view of what is shown in Fig. 1, Fig. 3, a section on the line 3—3 of Fig. 1, Fig. 4, a section on the line 4—4 of Fig. 1, and Fig. 5, a detail perspective view of one of the frames which hold the windows of the goggles.

Referring to the drawings, A and B indicate a pair of goggles which are hingedly connected together as at 10 and which are adapted to be secured in operative relation to the respective eyes of the user through the medium of a band 11 in the usual and well known manner. Each of the goggles A and B consists of an eye tube 12 provided near its outer end with a circumscribing rib 13 pressed therefrom. Detachably fitting upon the tube 12 is a window frame C which comprises a tubular member 14 having a circumscribing groove 15 pressed in the inner wall thereof and adapted to receive the rib 13 of the eye tube 12 when the window frame C is associated with the latter. In order to permit the frame C to slide upon the tube 12, said frame is provided with a plurality of longitudinally directed recesses 16 opening through its rear end and forming resultant tongues 17. These recesses and tongues terminate at the outer side of the groove 15 and by this construction it will be apparent that when the frame C is pushed upon the tube 12 the tongues 17 will be forced outwardly and passed over the rib 13 until said rib registers with the groove 15 when the tongues will contract upon the tube 12 so as to prevent longitudinal displacement of the frame C but at the same time permitting said frame to be rotated relatively to the tube 12. The outer end of the tubular member 14 is closed by a window D which consists of a pair of sections 18 and 19 the former of which is constituted of colored glass while the latter is constituted of plain or clear glass.

In use of the goggles should a brilliant light be disposed directly ahead the windows are adjusted so as to position the sections 18 and 19 thereof as shown in Fig. 1. In this position of the windows the sections 18 will be between the eye of the user and the light and the blinding effect of the latter entirely obviated so as to permit of the vision penetrating beyond the light and through the plain sections 19 of the windows. In case the light ahead is disposed to one side of the user as at sunset the frames C may be rotated so as to shift the sections 18 of the windows to the right or left as desired and thereby interpose same between the eye and the light.

What is claimed is:

A goggle construction comprising a pair of hingedly connected non-rotatably mounted eye tubes, each of which is provided with a circumscribing rib adjacent its outer end, a second tube rotatably mounted on each of said eye tubes, said second tubes being provided with longitudinal recesses from their inner end and extending a predetermined distance inwardly and further provided with an inner circumscribing groove interrupted by said recesses and receiving respective circumscribing ribs of the first named tubes, and a window closing the outer end of the second named tubes, each of said windows including transparent sections of different colors.

In testimony whereof, I affix my signature, in presence of two witnesses.

WALLACE R. HARRIS.

Witnesses:
M. JANETTA SMITH,
FRED M. PIERSON.